United States Patent
Jinno

(10) Patent No.: US 7,826,961 B2
(45) Date of Patent: Nov. 2, 2010

(54) CONTROL APPARATUS FOR INTERNAL COMBUSTION ENGINE AND METHOD OF CONTROLLING INTERNAL COMBUSTION ENGINE

(75) Inventor: Kunihiko Jinno, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 122 days.

(21) Appl. No.: 12/306,559

(22) PCT Filed: Jun. 27, 2007

(86) PCT No.: PCT/IB2007/001749

§ 371 (c)(1),
(2), (4) Date: Dec. 24, 2008

(87) PCT Pub. No.: WO2008/001198

PCT Pub. Date: Jan. 3, 2008

(65) Prior Publication Data

US 2009/0198438 A1 Aug. 6, 2009

(30) Foreign Application Priority Data

Jun. 29, 2006 (JP) ............................. 2006-180033

(51) Int. Cl.
*F02N 11/00* (2006.01)
(52) U.S. Cl. .................................. 701/112; 123/179.4
(58) Field of Classification Search ................. 701/112; 123/179.4
See application file for complete search history.

(56) References Cited

U.S. PATENT DOCUMENTS

| 6,817,329 B2 * | 11/2004 | Buglione et al. ......... 123/179.4 |
| 7,091,629 B2 * | 8/2006 | Hawkins .................... 307/10.6 |
| 2004/0211381 A1 | 10/2004 | Ogawa et al. |
| 2007/0209612 A1 * | 9/2007 | Kojima .................... 123/41.49 |

FOREIGN PATENT DOCUMENTS

| DE | 100 38 280 A1 | 3/2001 |
| DE | 100 29 231 A1 | 12/2001 |
| JP | 2002-211238 | 7/2002 |
| JP | 2002-295281 | 10/2002 |
| JP | 2007-230321 | 9/2007 |

* cited by examiner

*Primary Examiner*—Erick Solis
(74) *Attorney, Agent, or Firm*—Finnegan, Henderson, Farabow, Garrett & Dunner, LLP

(57) ABSTRACT

In an engine ECU (60), a threshold line $L_{S1}$ and a threshold line $L_{S2}$ are set as threshold lines used when stopping of an engine is prohibited based on a coolant temperature Tw. The threshold line $L_{S1}$ is set to ensure a predetermined heating capacity. The threshold value on the threshold line $L_{S2}$ is higher than the threshold value on the threshold line $L_{S1}$. When the vehicle is moving, the threshold line $L_{S2}$ is selected to prohibit/permit stopping of the engine. This increases the amount of heat stored in an engine coolant. When the vehicle is stopped, the threshold line $L_{S1}$ is selected to prohibit/permit stopping of the engine. This decreases the frequency of starting the engine in the stopped vehicle, while maintaining the predetermined heating capacity.

8 Claims, 8 Drawing Sheets

CONTROL APPARATUS FOR INTERNAL COMBUSTION ENGINE AND METHOD OF CONTROLLING INTERNAL COMBUSTION ENGINE

CROSS-REFERENCE TO RELATED APPLICATIONS

This application is a national phase application of International Application No. PCT/IB2007/001749, filed Jun. 27, 2007, and claims the priority of Japanese Application No. 2006-180033, filed Jun. 29, 2006, the contents of both of which are incorporated herein by reference.

BACKGROUND OF THE INVENTION

1. Field of the Invention

The invention relates to a control apparatus for an internal combustion engine, which controls the start and stop of the internal combustion engine in a vehicle driven by a driving force output from the internal combustion engine, and provided with a vehicular air conditioning device that conditions the air in a vehicle cabin using a coolant for the internal combustion engine as a heat source.

2. Description of the Related Art

A vehicular air conditioning device cools air using the evaporator of a refrigeration-cycle system, and heats the air using a heater core where an engine coolant for an internal combustion engine circulates. In this manner, the air conditioning device conditions the air. Then, the air conditioning device supplies the conditioned air into a vehicle cabin to cool or heat the vehicle cabin.

In recent years, vehicles in which a so-called economy-running control, such as an idling-stop control, is executed have become widely available. In the idling-stop control, when a predetermined engine stop condition is satisfied, an engine stops. When the engine is stopped, and a predetermined engine start condition (engine restart condition) is satisfied, the engine starts. Thus, for example, by executing the idling-stop control to stop the engine when the vehicle is stopped, fuel efficiency is improved, emission gas is reduced, and vibration and noise are suppressed when the vehicle is stopped.

When the air conditioner is heating the vehicle cabin, and the engine stops, the temperature of the engine coolant decreases. Further, the heating capacity of the air conditioner decreases due to the decrease in the temperature of the engine coolant. As a result, the air in the vehicle cabin is not conditioned (heated) to a desired level.

In vehicles, when the temperature of the engine coolant decreases, the engine generally is started to maintain the temperature of the engine coolant in a predetermined range. This suppresses the decrease in the heating capacity resulting from the decrease in the temperature of the engine coolant. In other words, the engine is driven and stopped based on the temperature of the engine coolant, that is, based on whether the temperature of the engine coolant is above a predetermined threshold value.

However, when the engine is started to suppress the decrease in the temperature of the engine coolant, the effect of improving the fuel efficiency and reducing emission gas is less significant. Further, although vibration, noise, and the like caused by the engine are suppressed in recent vehicles, occupants in the vehicles still feel noise and vibration when the vehicles are stopped. Particularly when the engine is repeatedly driven and stopped due to the changes in the temperature of the engine coolant, the occupants are discomforted by the vibration and noise.

Thus, Japanese Patent Application Publication No. 2002-211238 (JP-A-2002-211238) describes that there is a certain difference between the threshold value of the coolant temperature at which the engine restarts when the coolant temperature decreases, and the threshold value of the coolant temperature at which the engine automatically stops when the coolant temperature increases after the engine starts. This reduces the possibility that the engine repeatedly and frequently stops and restarts.

However, in the above-described case where there is the certain difference between the threshold value at which the engine restarts and the threshold value at which the engine stops, the engine still needs to restart to maintain the required heating capacity of the air conditioner when the coolant temperature decreases. Further, when the difference is set to maintain the required heating capacity, the engine operates for a long period of time.

SUMMARY OF THE INVENTION

The invention provides a control apparatus for an internal combustion engine that decreases the frequency of starting the internal combustion engine in a stopped vehicle while maintaining the required heating capacity of a vehicular air conditioning device, when executing a control to stop the internal combustion engine, such as an idling-stop control.

A first aspect of the invention relates to a control apparatus for an internal combustion engine, which stops the internal combustion engine when a stop condition is satisfied, starts the internal combustion engine when a start condition is satisfied, and is provided with a vehicular air conditioning device that heats a vehicle cabin using a coolant for the internal combustion engine. The control apparatus includes coolant-temperature detection means, stop prohibition means, movement determination means, and selection means. The coolant-temperature detection means detects the temperature of the coolant for the internal combustion engine. The stop prohibition means prohibits stopping of the internal combustion engine when the vehicular air conditioning device is heating the vehicle cabin, and the temperature of the coolant detected by the coolant-temperature detection means is equal to or below a threshold value that is set in advance. The movement determination means determines whether the vehicle is moving. The selection means selects a first threshold value as the threshold value used by the stop prohibition means. When the movement determination means determines that the vehicle is moving, the selection means selects a second threshold value that is higher than the first threshold value.

According to the first aspect of the invention, when the vehicular air conditioning device is heating the vehicle cabin, and the vehicle is stopped, and the temperature of the coolant is equal to or below the first threshold value, stopping of the internal combustion engine is prohibited. Thus, the desired heating capacity of the vehicular air conditioning device is obtained.

When the vehicular air conditioning device is heating the vehicle cabin, and the movement determination means determines that the vehicle is moving, and the temperature of the coolant is equal to or below the second threshold value, which is higher than the first threshold value, stopping of the internal combustion engine is prohibited.

Thus, when the vehicle is moving, the temperature of the coolant is maintained at a high temperature, and a large amount of heat is stored in the coolant. This increases the time until the temperature of the coolant decreases to the first threshold value when the vehicle stops, and accordingly the internal combustion engine is stopped.

Accordingly, it is possible to decrease the frequency with which the internal combustion engine is driven due to the decrease in the temperature of the coolant when the vehicle is stopped.

According to a second aspect of the invention, the movement determination means includes at least one of vehicle-speed detection means, braking determination means, and accelerator-pedal operation detection means. The vehicle-speed detection means detects a vehicle speed. The braking determination means determines whether a brake is applied to the vehicle by performing a braking operation. The accelerator-pedal operation detection means detects a parameter that changes according to the operation of the accelerator pedal of the vehicle. The movement determination means determines whether the vehicle is moving, using at least one of the vehicle-speed detection means, the braking determination means, and the accelerator-pedal operation detection means.

According to the second embodiment, it is determined whether the vehicle is moving, based on at least one of the vehicle speed detected by the vehicle-speed detection means, the determination made by the braking determination means, and the parameter detected by the accelerator-pedal operation detection means.

Thus, it is possible to easily and appropriately determine whether the vehicle is moving. The braking determination means may determine whether a brake pedal is operated and whether a parking brake is operated. The accelerator-pedal operation detection means may determine whether an accelerator pedal is operated, and may determine the amount by which the accelerator pedal is depressed. Alternatively, the accelerator-pedal operation detection means may detect, for example, the opening degree of a throttle valve operated according to the operation of the accelerator pedal.

Another aspect of the invention relates to a method of controlling an internal combustion engine, which stops the internal combustion engine when a stop condition is satisfied, starts the internal combustion engine when a start condition is satisfied, and is provided with a vehicular air conditioning device that heats a vehicle cabin using the coolant for the internal combustion engine. The method includes: detecting the temperature of the coolant for the internal combustion engine; prohibiting stopping of the internal combustion engine when the vehicular air conditioning device is heating the vehicle cabin and the detected temperature of the coolant is equal to or below a threshold value that is set in advance; determining whether the vehicle is moving; and selecting a first threshold value as the threshold value used to determine whether to prohibit stopping of the internal combustion engine, and selecting a second threshold value, which is higher than the first threshold value, when it is determined that the vehicle is moving.

In the above-described aspect of the invention, it may be determined whether the vehicular air conditioning device is heating the vehicle cabin, using the target temperature of air supplied into the vehicle cabin, which is set based on the target temperature of the vehicle cabin (preset temperature of the vehicular air conditioning device) and an environment condition. Alternatively, it may be determined whether the vehicular air conditioning device is heating the vehicle cabin, based on the values relating to a heating load with respect to the preset temperature of the air conditioner, such as the temperature of the vehicle cabin and the temperature of the air outside the vehicle.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 6B shows a case where only a threshold line $L_{S1}$ is employed, and FIG. 6C shows a case where a threshold line $L_{S2}$ is employed when the vehicle is moving, and the threshold line $L_{S1}$ is employed when the vehicle is stopped;

DETAILED DESCRIPTION OF THE EXAMPLE EMBODIMENTS

Figure 2:
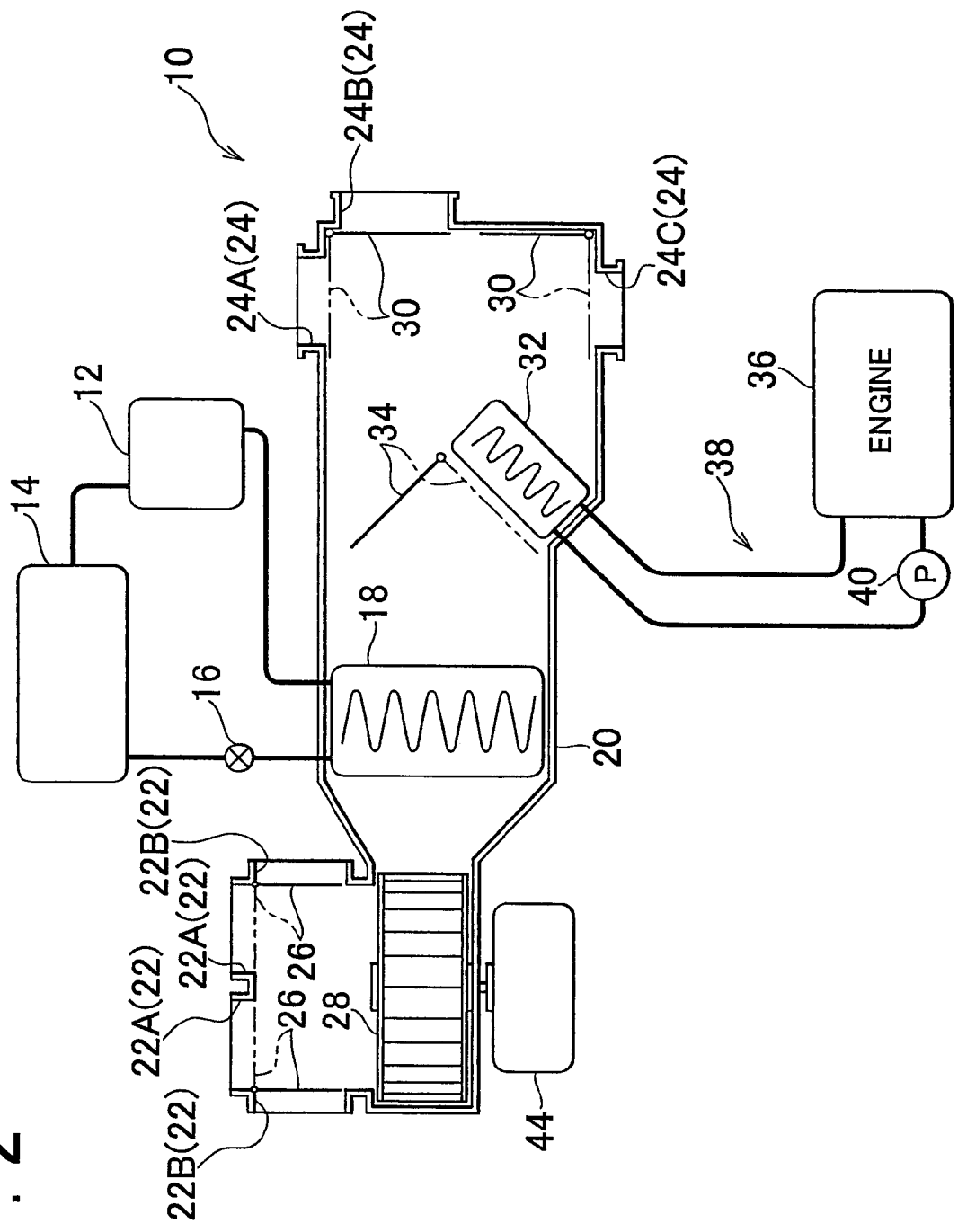
FIG. 2 is a schematic diagram showing the configuration of an air conditioner according to the embodiment of the invention.

Hereinafter, an example embodiment of the invention will be described in detail with reference to the drawings. FIG. 2 schematically shows the configuration of the air conditioner 10 that is used as the vehicular air conditioning device in the embodiment.

In the air conditioner 10, a compressor 12, a condenser 14, an expansion valve 16, and an evaporator 18 form a refrigeration-cycle system. Cooling medium circulates in the refrigeration-cycle system. The cooling medium is compressed by rotating the compressor 12, and then the cooling medium is liquefied. The liquefied cooling medium is supplied to the evaporator 18, and is evaporated in the evaporator 18. At this time, heat is transferred from air that passes through the evaporator 18 to the cooling medium in the air conditioner 10. As a result, the air that passes through the evaporator 18 is cooled.

The air conditioner 10 includes an air-conditioning duct 20. The evaporator 18 is provided in the air-conditioning duct 20. Air inlets 22 are formed at one end of the air-conditioning duct 20. Air outlets 24 are formed at the other end of the air-conditioning duct 20.

In the air conditioner 10, the air inlets 22 include air inlets 22A and air inlets 22B. The air inlets 22A are open to a vehicle cabin (not shown) so that air in the vehicle cabin is introduced into the air conditioner 10 through the air inlets 22A. The air inlets 22B are open to the atmosphere so that air outside the vehicle hereinafter, referred to as "outside air") is introduced into the air conditioner 10 through the air inlets 22B. In the air-conditioning duct 20, mode-switching dampers 26 and a blower fan 28 are provided. The mode-switching dampers 26 open/close the air inlets 22A and 22B.

In the air conditioner 10, a recirculation mode or a fresh-air mode is selected. In the recirculation mode, the air conditioner 10 conditions the air inside the vehicle cabin (hereinafter, referred to as "inside air"), and supplies the conditioned air into the vehicle cabin. In the fresh-air mode, the air conditioner 10 conditions the outside air, and supplies the conditioned air into the vehicle cabin. When the recirculation mode is selected, the mode-switching dampers 26 close the air inlets 22B, and open the air inlets 22A. When the fresh-air introduction mode is selected, the mode-switching dampers 26 close the air inlets 22A and open the air inlets 22B.

Thus, when the blower fan 28 operates, the inside air or the outside air is drawn into the evaporator 18 through the air inlets 22A or 22B.

The air outlets 24 include a defroster outlet 24A, an outlet 24B, and a foot outlet 24C. The defroster outlet 24A is connected to a center defroster outlet and a side defroster outlet that are directed to, for example, the windshield of the vehicle. The outlet 24B is connected to a center outlet and a side outlet that are directed to occupants in the vehicle cabin. The foot outlet 24C is directed to the feet of occupants seated on the front and rear seats.

Switching dampers 30 are provided in the air-conditioning duct 20. The switching dampers 30 selectively open/close the defroster outlet 24A, outlet 24B, and foot outlet 24C.

In the air conditioner 10, a DEF mode, a FACE mode, a FOOT mode, a DEF/FOOT mode, or a BI-LEVEL mode is selected as an air-supply mode for supplying the conditioned air into the vehicle cabin. In the DEF mode, the conditioned air is supplied into the vehicle cabin through the defroster outlet 24A. In the FACE mode, the conditioned air is supplied into the vehicle cabin through the outlet 24B. In the FOOT mode, the conditioned air is supplied into the vehicle cabin through the foot outlet 24C. In the DEF/FOOT mode, the conditioned air is supplied into the vehicle cabin through the defroster outlet 24A and foot outlet 24C. In the BI-LEVEL mode, the conditioned air is supplied into the vehicle cabin through the outlet 24B and foot outlet 24C. In the air conditioner 10, the switching dampers 30 open/close the defroster outlet 24A, outlet 24B, and foot outlet 24C according to the selected air-supply mode.

A heater core 32 and an air-mix damper 34 are provided in the air-conditioning duct 20 of the air conditioner 10. After the air passes through the evaporator 18, a part of the air is directed to pass through the heater core 32, and the rest of the air is directed to bypass the heater core 32 by the air-mix damper 34. The air that passed through the heater core 32 is mixed with the air that has bypassed the heater core 32 at the area downstream of the heater core 32.

Thus, in the air conditioner 10, the air is conditioned to a predetermined temperature. That is, by controlling the opening degree of the air-mix damper 34, the air is conditioned to a target air temperature so that the temperature of the vehicle cabin is equal to the target temperature of the vehicle cabin preset in the air conditioner 10 (hereinafter, referred to as "the preset temperature of the air conditioner 10").

In the vehicle provided with the air conditioner 10, an internal combustion engine (hereinafter, simply referred to as "engine") 36 is provided. The engine 36 is a drive source for driving the vehicle. The engine 36 is a water-cooled internal combustion engine that has an ordinary configuration. That is, the engine 36 is provided with a water jacket formed in the cylinder block and the cylinder head (none of them are shown). Engine coolant circulates in the water jacket.

The engine coolant circulates between the engine 36 and an engine radiator (not shown). This suppresses an increase in the temperature of the engine 36 due to heat generation when the engine 36 operates. Any vehicle provided with an internal combustion engine for driving the vehicle, for example, the engine 36, may be employed in the embodiment. Accordingly, the vehicle in this embodiment may be a so-called hybrid vehicle that is driven by the engine 36 and/or an electric motor.

A coolant passage 38 is formed between the heater core 32 and the engine 36. By driving a water pump 40, the engine coolant is circulated in the coolant passage 38 between the heater core 32 and the engine 36. In the air conditioner 10, the air is heated using the engine coolant that circulates in the heater core 32.

Figure 3:
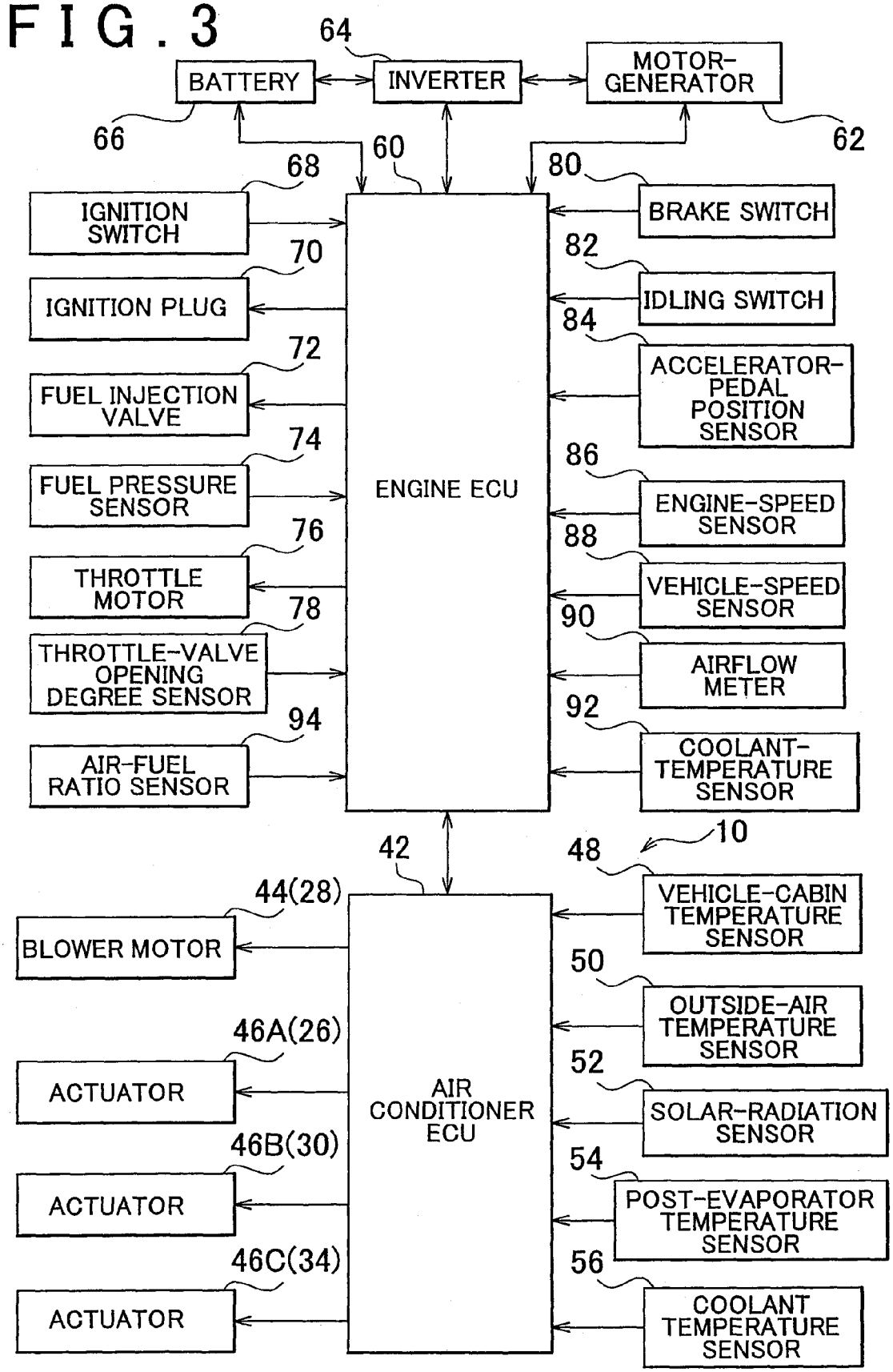
FIG. 3 is a block diagram showing a schematic configuration of control portions that control an engine and the air conditioner.

As shown in FIG. 3, an air conditioner ECU 42 is provided to control the air conditioner 10. The air conditioner ECU 42 is connected to a blower motor 44, and actuators 46A, 46B, and 46C. The blower motor 44 drives the blower fan 28. The actuators 46A, 46B and 46C operate the mode-switching dampers 26, switching dampers 30, and air-mix damper 34, respectively.

A dedicated motor (compressor motor) may be used to drive the compressor 12. Alternatively, a drive source for driving the vehicle, such as the engine 36, or a drive source for driving the other auxiliary machine may be used to drive the compressor 12. When the compressor motor is used, the compressor motor may be connected to the air conditioner ECU 42. In this case, the air conditioner ECU 42 controls (operates/stops) the compressor motor, and controls the rotational speed of the compressor motor. When the engine 36 or the drive source for driving the other auxiliary machine is used, for example, an electromagnetic clutch may be provided. In this case, the electromagnetic clutch connects/disconnects the compressor 12 to/from the drive source. The electromagnetic clutch is connected to the air conditioner ECU 42. The air conditioner ECU 42 turns the compressor 12 on/off by turning the electromagnetic clutch on/off. The compressor motor, the drive source for driving the other auxiliary machine, and the electromagnetic clutch are not shown.

The air conditioner ECU 42 is connected to a vehicle-cabin temperature sensor 48, an outside-air temperature sensor 50, a solar-radiation sensor 52, a post-evaporator temperature sensor 54, and the like. The vehicle-cabin temperature sensor 48 detects the temperature of the vehicle cabin. The outside-air temperature sensor 50 detects the temperature of the outside air. The solar-radiation sensor 52 detects the amount of solar radiation. The post-evaporator temperature sensor 54 detects the temperature of the air that has passed through the evaporator 18.

When an operating condition (for example, the operating mode and the preset temperature of the air conditioner 10) is set by operating a switch provided in an operation panel (not shown), the air conditioner ECU 42 operates the air conditioner 10 so that the temperature of the vehicle cabin is equal to the preset temperature, by controlling the blower motor 44, actuators 46A to 46C, and the like, based on the operating condition and an environment condition (for example, the temperature of the vehicle cabin, the temperature of the outside air, and the amount of solar radiation).

For example, when an automatic mode is selected, the air conditioner ECU 42 calculates the target air temperature $T_{AO}$, which is the target temperature of the air supplied into the vehicle cabin, based on the preset temperature $T_{SET}$, the environment condition, and the like. Then, the air conditioner ECU 42 sets the amount of air to be supplied by operating the blower fan 28 (hereinafter, this amount will be referred to as "blower air amount"), the opening degree of the air-mix damper 34, the air-supply mode, and the like, based on the target air temperature $T_{AO}$. Then, the air conditioner ECU 42 operates the blower motor 44, and actuators 46A to 46C, based on the settings.

The target air temperature $T_{AO}$ is generally determined based on the preset temperature $T_{SET}$, a vehicle-cabin temperature Tr, an outside-air temperature $T_O$, and a solar radiation amount ST, according to the equation described below.

$T_{AO} = K_1 \times T_{SET} - K_2 \times T_O - K_3 \times Tr - K_4 \times ST + C$ (in this equation, K1, K2, K3, K4, and C are set constant values). The blower air amount may be set based on the target air temperature $T_{AO}$. For example, when the difference between the target air temperature $T_{AO}$ and a reference temperature is small, the blower air amount is set to a small amount. The reference temperature may be the preset temperature $T_{SET}$, or a temperature that is set in advance. As the difference between the target air temperature $T_{AO}$ and the reference temperature increases, the blower air amount increases. The drive voltage for driving the blower motor 44 is set based on the set blower air amount.

In the air conditioner 10, the air is conditioned to the target air temperature $T_{AO}$ by mixing the air that has passed through the heater core 32, and the air that has bypassed the heater core 32. The opening degree of the air-mix damper 34 is set based on the ratio of the amount of air that passes through the heater core 32 to the entire amount of air (hereinafter, this ratio will be referred to as "mixing ratio r"). The mixing ratio r is calculated based on the temperature of the air that has passed through the evaporator 18 (hereinafter, this temperature will be referred to as "post-evaporator temperature Te"), and the temperature of the air that has passed through the heater core 32 (hereinafter, this temperature will be referred to as "post-heater core temperature Th"), according to the equation, $r = (T_{AO} - Te)/(Th - Te)$.

The post-evaporator temperature sensor 54 detects the post-evaporator temperature Te. A temperature sensor (post-heater core temperature sensor) may be provided downstream of the heater core 32 to detect the post-heater core temperature Th. Alternatively, the post-heater core temperature Th may be calculated based on the temperature Tw of the coolant, the flow amount of coolant, and the temperature efficiency of the heater core 32. When the post-heater core temperature Th is calculated based on the coolant temperature Tw, the flow amount of coolant, and the temperature efficiency of the heater core 32, the air conditioner ECU 42 is connected to a coolant temperature sensor 56. The flow amount of coolant is determined based on the rotational speed of the water pump 40. The relation between the temperature efficiency of the heater core 32 and the flow amount of engine coolant may be determined in advance, and the temperature efficiency may be determined based on the flow amount of engine coolant.

Thus, the air conditioner ECU 42 calculates the mixing ratio r, that is, the ratio of the amount of air that passes through the heater core 32 to the entire amount of air, based on the target air temperature $T_{AO}$, post-evaporator temperature Te, and coolant temperature Tw. The opening degree S of the air-mix damper 34 is set based on the mixing ratio r. The actuator 46C operates so that the actual opening degree of the air-mix damper 34 is equal to the set opening degree S. The air conditioner 10 may operate in a known ordinary manner.

In the vehicle, an engine ECU 60 is provided to control the engine 36 (refer to FIG. 2). The engine ECU 60 includes a microcomputer that includes a CPU, ROM, RAM, and the like. When a predetermined engine stop condition is satisfied, the engine ECU 60 stops the engine 36. The engine stop condition may be satisfied, for example, when the vehicle stops. When the vehicle is stopped, and an engine restart condition is satisfied, the engine ECU 60 restarts the engine 36. The engine ECU 60 may execute a so-called economy-running control such as an idling-stop control in a known ordinary manner, for example, to improve fuel efficiency, to suppress noise and vibration, and to reduce emission gas.

The engine 36 shown in FIG. 2 has an ordinary configuration. That is, the engine 36 includes the cylinder head and cylinder block. A combustion chamber is defined by the cylinder head, cylinder block, and a piston provided in the cylinder block. In the cylinder head of the engine 36, an intake port (not shown) and an exhaust port (not shown) are formed. An intake valve (not shown) opens/closes the intake port. An exhaust valve (not shown) opens/closes the exhaust port.

In the engine 36, when the intake valve opens the intake port, air is taken into the combustion chamber via a throttle valve, a surge tank, and the intake port. When the exhaust valve opens the exhaust port, exhaust gas is discharged from the combustion chamber via the exhaust port, and then the exhaust gas is discharged to the atmosphere via a catalyst for purifying the exhaust gas. Fuel is supplied under high pressure to a fuel injection valve via a delivery pipe, and the fuel is injected to the combustion chamber from the fuel injection valve. Thus, air-fuel mixture is generated. An ignition plug ignites the air-fuel mixture to burn the air-fuel mixture. The piston reciprocates due to the combustion of the air-fuel mixture.

In the engine 36, the reciprocating movement of the piston is converted to the rotational movement of a crankshaft via a connecting rod. The rotational movement is transmitted to wheels via a torque converter and a transmission. Thus, the wheels are rotated. The vehicle has an ordinary configuration. That is, in the vehicle, a motor-generator and auxiliary machines are driven by the driving force output from the engine 36.

As shown in FIG. 3, the engine ECU 60 is connected to the motor-generator 62. The electric power generated by the motor-generator 62 driven by the engine 36 is transmitted to a battery 66 via the inverter 64, and the battery 66 is charged with the electric power. When the electric power stored in the battery 66 is supplied to the motor-generator 62 via the inverter 64, the motor-generator 62 is rotated. At this time, by executing the phase control of the inverter 64, the motor-generator 62 is controlled.

In this embodiment, the so-called hybrid vehicle is employed as an example. The hybrid vehicle is driven by the driving force output from the engine 36 and/or the driving force output from the motor-generator 62. The auxiliary machines that include the compressor 12 and water pump 40 are driven by the driving force output from the engine 36, or the driving force output from the motor-generator 62.

The engine ECU 60 is connected to an ignition switch 68, an ignition plug 70, a fuel injection valve 72, a fuel pressure sensor 74, a throttle motor 76, a throttle-valve opening degree sensor 78, a brake switch 80, an idling switch 82, an accelerator-pedal position sensor 84, an engine-speed sensor 86, a vehicle-speed sensor 88, an airflow meter 90, a coolant-temperature sensor 92, an air-fuel ratio sensor 94, and the like. The fuel pressure sensor 74 detects the pressure of fuel in the delivery pipe. The throttle motor 76 drives a throttle valve. The throttle-valve opening degree sensor 78 detects the opening degree of the throttle valve. The brake switch 80 determines whether a brake pedal is depressed, and whether a parking brake is operated. The idling switch 82 determines whether an accelerator pedal is depressed. The accelerator-pedal position sensor 84 detects the amount by which the accelerator pedal is depressed (hereinafter, referred to as "the accelerator-pedal operation amount"). The engine-speed sensor 86 determines the engine speed based on, for example, the rotational speed of the crankshaft. The vehicle-speed sensor 88 detects the vehicle speed. The airflow meter 90 detects the amount of intake air. The coolant-temperature sensor 92 detects the temperature of the engine coolant. The air-fuel ratio sensor 94 detects the air-fuel ratio of exhaust gas. Further, the engine ECU 60 detects the rotational speed of the motor-generator 62, and the amount of electric power with which the battery 66 is charged and the amount of electric power discharged from the battery 66.

The engine ECU 60 adjusts the opening degree of the throttle valve by driving the throttle motor 76, based on the detection results transmitted from the above-described sensors and the like. The engine ECU 60 adjusts the amount of fuel injected from the fuel injection valve 72, and operates the engine 36 in a homogenous-charge combustion mode, or a stratified-charge combustion mode. In the homogenous-charge combustion mode, the fuel is injected into the combustion chamber during an intake stroke. In the stratified-charge combustion mode, the fuel is injected into the combustion chamber at the end of a compression stroke.

In the engine ECU 60, the engine stop condition and the engine restart condition are set and stored in advance. When the engine stop condition is satisfied, the engine ECU 60 stops the fuel injection from the fuel injection valve 72, and stops the engine 36. When the engine 36 is stopped, and the engine restart condition is satisfied, the engine ECU 60 drives the motor-generator 62 to restart the engine 36. In addition, the engine ECU 60 drives the engine 36 by executing controls such as the control of the ignition timing in the engine 36.

The engine stop condition and the engine restart condition stored in the engine ECU 60 relate to the coolant temperature Tw. In the engine ECU 60, settings are made such that when the coolant temperature Tw is equal to or above a predetermined temperature, stopping of the engine 36 is permitted, and when the coolant temperature Tw is equal to or below the predetermined temperature, the engine 36 restarts.

In the air conditioner 10, the air is heated using the engine coolant. When the coolant temperature Tw decreases, the heating capacity of the air conditioner 10 decreases. It may be determined whether the air conditioner 10 is heating the vehicle cabin, based on the target air temperature $T_{AO}$. As the target air temperature $T_{AO}$ increases, the required heating capacity of the air conditioner 10 increases. Because the target air temperature $T_{AO}$ is calculated based on the outside-air temperature $T_O$, vehicle-cabin temperature Tr, and solar radiation amount ST, the required heating capacity of the air conditioner 10 may be determined based on the outside-air temperature $T_O$, vehicle-cabin temperature Tr, or solar radiation amount ST.

That is, as the outside-air temperature $T_O$, vehicle-cabin temperature Tr, or solar radiation amount St decreases, the required heating capacity of the air conditioner 10 increases. Therefore, as the outside-air temperature $T_O$, vehicle-cabin temperature Tr, or solar radiation amount St decreases, the coolant temperature Tw, which relates to the heating capacity of the air conditioner 10, may be increased.

Thus, because the heating capacity of the air conditioner 10 relates to the coolant temperature Tw, the engine ECU 60 executes the control to stop/restart the engine 36 based on the coolant temperature Tw.

Figure 1:
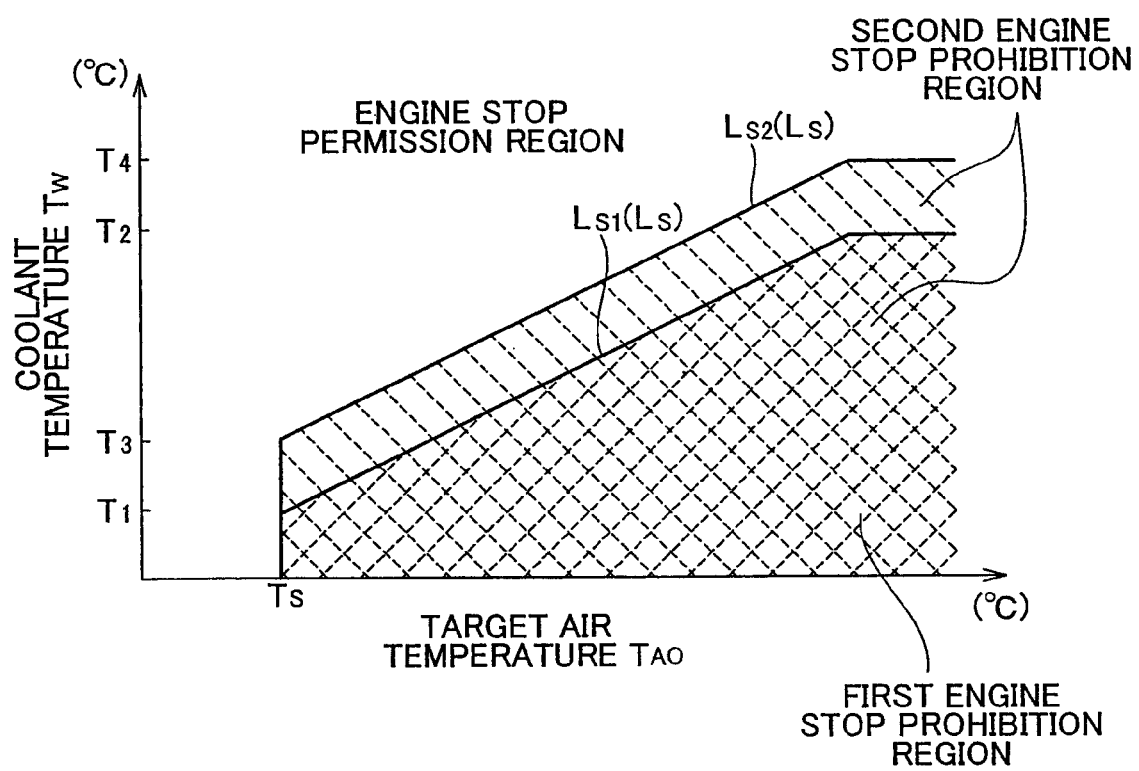
FIG. 1 is a graph showing the threshold values of an engine coolant temperature with respect to a target air temperature according to an embodiment of the invention.

As shown in FIG. 1, when the target air temperature $T_{AO}$ is below the reference temperature Ts ($T_{AO}<Ts$), the engine ECU 60 permits stopping of the engine 36 based on the heating capacity of the air conditioner 10 (refer to "engine stop permission region" in FIG. 1). When the target air temperature $T_{AO}$ is equal to or above the reference temperature Ts ($T_{AO} \geq Ts$), the engine ECU 60 prohibits stopping of the engine 36 based on the coolant temperature Tw, and the threshold value of the coolant temperature Tw with respect to the target air temperature $T_{AO}$.

In the engine ECU 60, threshold lines $L_S$ are set to define the engine stop permission region where stopping of the engine 36 is permitted, and engine stop prohibition regions where stopping of the engine 36 is prohibited. The threshold lines $L_S$ include a threshold line $L_{S1}$ and a threshold line $L_{S2}$. The threshold line $L_{S1}$ indicates the first threshold value of the coolant temperature Tw, and the threshold line $L_{S2}$ indicates the second threshold value of the coolant temperature Tw.

The second threshold value on the threshold line $L_{S2}$ is higher than the first threshold value on the threshold line $L_{S1}$. That is, when the threshold line $L_{S2}$ is selected, stopping of the engine 36 is permitted at a higher coolant temperature Tw than when the threshold line $L_{S1}$ is selected. The threshold line $L_{S1}$ separates the engine stop permission region and a first engine stop prohibition region. The threshold line $L_{S2}$ separates the engine stop permission region and a second engine stop prohibition region. The second engine stop prohibition region includes the first engine stop prohibition region.

As the target air temperature $T_{AO}$ increases, a heating load and the coolant temperature Tw may be increased. The temperature $T_1$ is the lower limit of the first threshold value on the threshold line $L_{S1}$. The temperature $T_2$ is the upper limit of the first threshold value on the threshold line $L_{S1}$. Thus, the first threshold value of the coolant Tw increases according to the target air temperature $T_{AO}$ in the range of the temperature $T_1$ to the temperature $T_2$. When the coolant temperature Tw is above the first threshold value on the threshold line $L_{S1}$, the required heating capacity of the air conditioner 10 is ensured The temperature $T_3$ ($T_1<T_3$) is the lowest limit of the second threshold value on the threshold line $L_{S2}$. The temperature $T_4$ ($T_2<T_4$) is the upper limit of the second threshold value on the threshold line $L_{S2}$. Thus, the second threshold value of the coolant Tw increases according to the target air temperature $T_{AO}$ in the range of the temperature $T_3$ to the temperature $T_4$.

Thus, when the target air temperature $T_{AO}$ for the air conditioner 10 is above the reference temperature Ts, and the coolant temperature Tw is above the first or second threshold value on the threshold line $L_{S1}$ or $L_{S2}$ with respect to the target air temperature $T_{AO}$, the engine ECU 60 permits stopping of the engine 36. When the engine 36 is stopped, and the coolant temperature Tw is equal to or below the first or second threshold value on the threshold line $L_{S1}$ or $L_{S2}$, the engine ECU 60 restarts the engine 36.

The engine ECU 60 ordinarily permits or prohibits stopping of the engine 36 based on the coolant temperature Tw, and the first threshold value on the threshold line $L_{S1}$ with respect to the target air temperature $T_{AO}$. Each of the threshold lines $L_{S1}$ and $L_{S2}$ may have a certain width (hysteresis width). In this case, there is a certain difference between the threshold value at which stopping of the engine 36 is permitted, and the threshold value at which stopping of the engine 36 is prohibited. This reduces the possibility that stopping of the engine 36 is frequently and repeatedly prohibited and permitted.

When the engine 36 is stopped, and the air is heated using the engine coolant that circulates in the heater core 32, the temperature Tw of the engine coolant decreases. Thus, for example, when the vehicle is stopped and the coolant temperature Tw decreases, the engine 36 restarts.

In this embodiment, when the air conditioner 10 is heating the vehicle cabin, and the vehicle is moving, the threshold line $L_{S2}$ of the threshold lines $L_S$ is selected. Thus, when the air conditioner 10 is heating the vehicle cabin, and the vehicle is moving, the frequency of starting the engine 36 is increased, and the coolant temperature Tw is maintained at a high temperature. This increases the amount of heat stored in the engine coolant.

When the ignition switch 68 is turned on to enable the vehicle to start, the engine ECU 60 with the above-described configuration drives the engine 36 and/or motor-generator 62 according to, for example, the operation of the accelerator pedal (not shown) or the brake pedal (not shown). Thus, the vehicle is driven by the driving force output from the engine 36 and/or the motor-generator 62.

When the operating condition (for example, the preset temperature $T_{SET}$) is set on the operation panel (not shown), and the instruction is provided to operate the air conditioner 10, the target air temperature $T_{AO}$, the opening degree S of the air-mix damper 34, and the blower air amount are set based on the preset temperature $T_{SET}$ and the environment condition. Then, by operating the blower motor 44 and actuators 46A to 46C based on the set target air temperature, set opening degree S, and set blower air amount, and the operating condition, the air conditioner 10 is operated so that the temperature of the vehicle cabin is equal to the preset temperature $T_{SET}$.

The engine ECU 60 detects the values that indicate the driver's operation in the vehicle and movement of the vehicle, and executes the so-called economy-running control. That is, when the predetermined engine stop condition is satisfied, the engine 36 stops. When the engine 36 is stopped, and the engine restart condition is satisfied, the engine 36 restarts.

Figure 4:
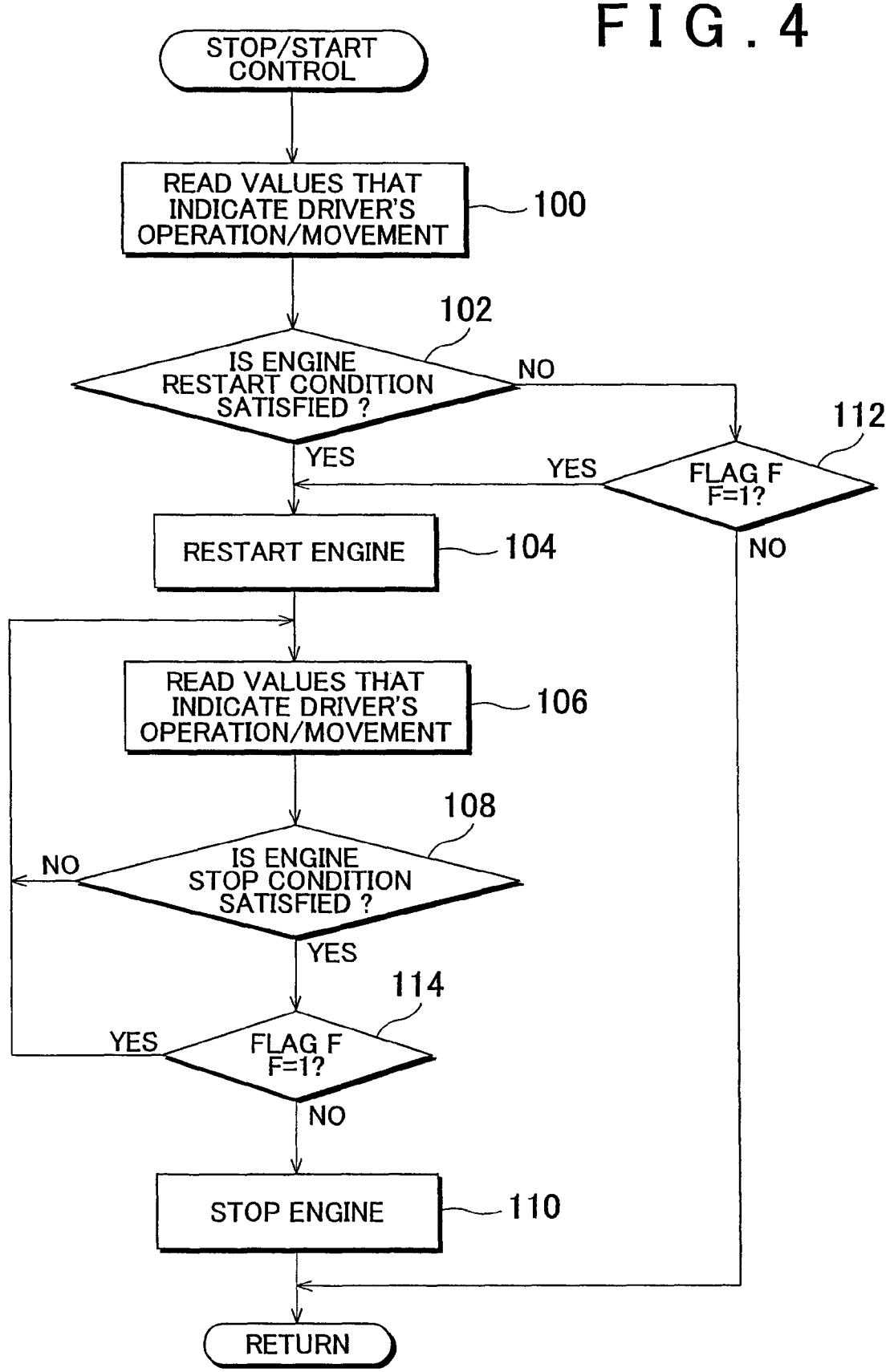
FIG. 4 is a flowchart schematically showing the control that stops/starts the engine.

FIG. 4 schematically shows the flowchart of the control to stop/restart the engine 36. When the ignition switch 68 is turned on, the routine shown by the flowchart starts. When the ignition switch 68 is turned off, the routine ends. The basic engine stop condition and the basic engine restart condition may be a known engine stop condition and a known engine restart condition, respectively. Therefore, the detailed description of the engine stop condition and the engine restart condition will be omitted.

The routine shown by this flowchart starts when the ignition switch 68 is turned on and the engine 36 is stopped. In step 100, the values detected by the sensors and the like are read. The values detected by the sensors and the like indicate the driver's operation in the vehicle and movement of the vehicle. In step 102, it is determined whether the engine restart condition (engine start condition) is satisfied.

When the engine restart condition is satisfied (i.e., an affirmative determination is made in step 102), the routine proceeds to step 104. In step 104, the engine 36 starts (restarts). This enables the vehicle to move using the driving force output from the engine 36.

Then, in step 106, the values that indicate the driver's operation in the vehicle and movement of the vehicle are read. In step 108, it is determined whether the engine stop condition for stopping the engine 36 is satisfied.

For example, when the coolant temperature Tw is in a predetermined range, and the vehicle stops, and accordingly the engine stop condition is satisfied, an affirmative determination is made in step 108. In this case, the routine may proceed to step 110. In step 110, the engine 36 is stopped.

Thus, when the engine stop condition is satisfied, the engine ECU 60 stops the engine 36. When the engine restart condition is satisfied, the ECU 60 restarts the engine 36. Thus, the engine 36 is intermittently driven. This improves fuel efficiency, and reduces emission gas.

When the air conditioner 10 is heating the vehicle cabin, the engine ECU 60 decreases the frequency of stopping the engine 36 so that the coolant temperature Tw is maintained at a predetermined level and a predetermined heating capacity is ensured. When the engine 36 is stopped, and the engine restart condition is not satisfied, a negative determination is made in step 102, and the routine proceeds to step 112. In step 112, it is determined whether the value of a flag F is 1.

When the engine 36 is driven, and the engine stop condition is satisfied (i.e., an affirmative determination is made in step 108), it is determined whether the value of the flag F is 1 in step 114, before the engine 36 is stopped in step 110.

In this embodiment, the flag F is used to indicate whether to prohibit stopping of the engine 36 based on the coolant temperature Tw when the air conditioner 10 is operating. When the flag F is set to 1 (F=1), stopping of the engine 36 is prohibited.

Thus, in the flowchart in FIG. 4, when the flag F is set to 1, an affirmative determination is made in step 112, and the routine proceeds to step 104. In step 104, the engine 36 restarts. When the engine stop condition is satisfied, and the flag F is set to 1, an affirmative determination is made in step 114. In this case, the engine 36 continues to be driven.

Figure 5:
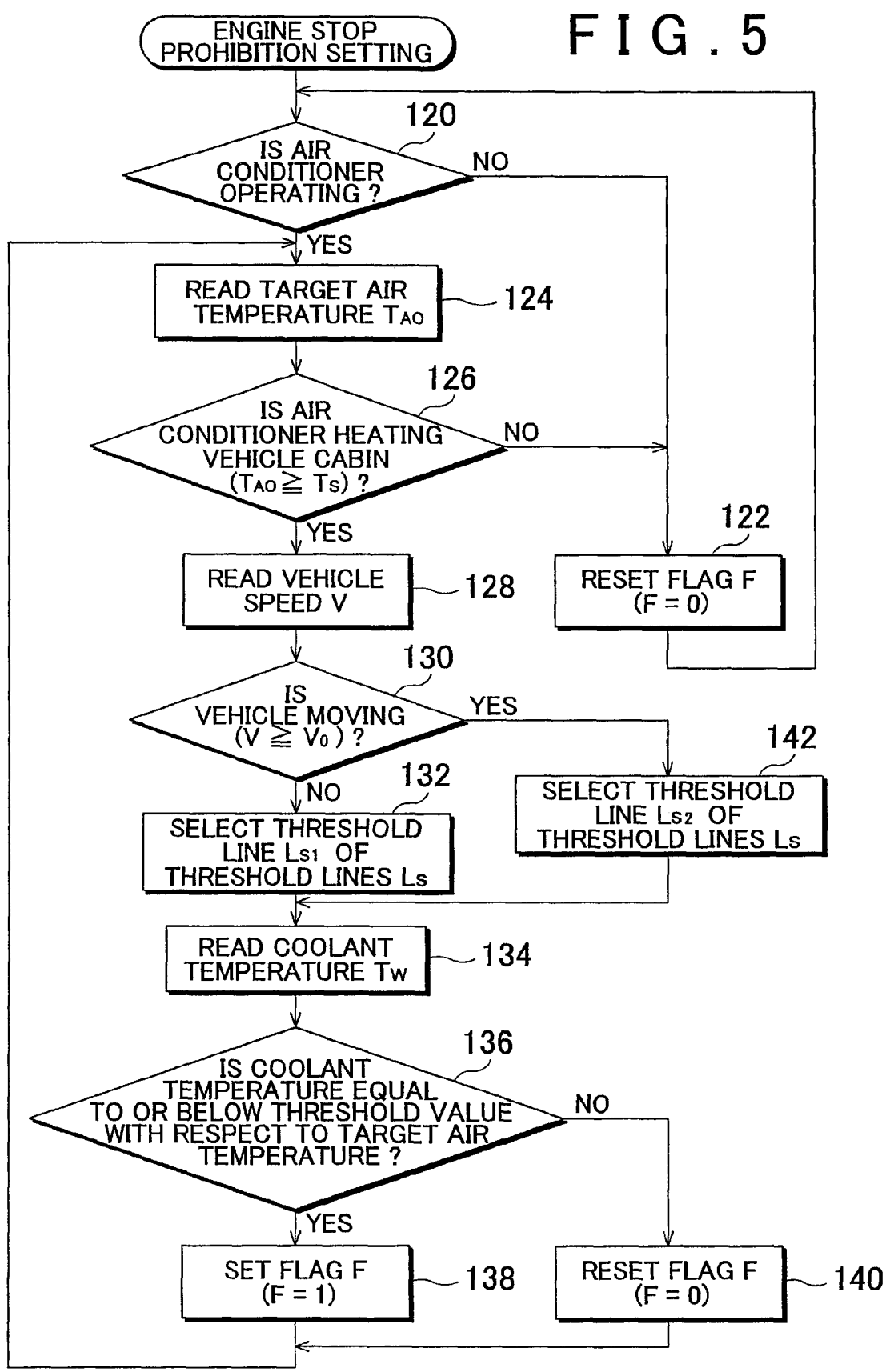
FIG. 5 is a flowchart schematically showing the control that makes the settings to prohibit the stop of the engine when the air conditioner is heating a vehicle cabin.

FIG. 5 schematically shows the control that makes the settings to prohibit stopping of the engine 36. When the ignition switch 68 is turned on, the routine shown by the flowchart starts. When the ignition switch 68 is turned off, the routine ends. In step 120, it is determined whether the air conditioner 10 is operating.

When the air conditioner 10 is stopped (i.e., a negative determination is made in step 120), the routine proceeds to step 122. In step 122, the flag F is reset (i.e., the flag F is set to 0).

When the air conditioner 10 is operating (i.e., an affirmative determination is made in step 120), the routine proceeds to step 124. In step 124, the target air temperature $T_{AO}$ calculated in the air conditioner ECU 42 is read. Then, in step 126, it is determined whether the target air temperature $T_{AO}$ is equal to or above the reference temperature Ts.

When the target air temperature $T_{AO}$ is below the reference temperature Ts, for example, when the air conditioner 10 is cooling the vehicle cabin, a negative determination is made in step 126, and the routine proceeds to step 122. In step 122, the flag F is reset (i.e., the flag F is set to 0).

Thus, according to the flowchart in FIG. 4, the engine 36 is intermittently driven based on the engine stop condition and the engine restart condition. The reference temperature Ts may be set in advance, or set based on the preset temperature $T_{SET}$ when the air-conditioner 10 is operating. The reference temperature Ts may be set to any temperature as long as it can be appropriately determined whether the air conditioner 10 is heating the vehicle cabin based on the target air temperature $T_{AO}$.

When the target air temperature $T_{AO}$ is above the reference temperature Ts, and it is determined that the air conditioner 10 is heating the vehicle cabin, an affirmative determination is made in step 126, and the routine proceeds to step 128.

In step 128, the vehicle speed (hereinafter, referred to as "speed v") detected by the vehicle-speed sensor 88 is read. Then, in step 130, it is determined whether the speed v is equal to or above a set speed $v_0$, and the vehicle is moving. The speed $v_0$ may be set to "0" ($v_0$=0 km/h) at which the vehicle is stopped. Alternatively, the speed $v_0$ may be set to a speed at which the vehicle is substantially stopped (for example, $v_0$=2 to 5 km/h). In this case as well, it can be determined whether the vehicle is moving based on the set speed $v_0$.

When the speed v of the vehicle is below the set speed $v_0$, and accordingly it is determined that the vehicle is stopped, a negative determination is made in step 130, and the routine proceeds to step 132. In step 132, the standard threshold line $L_{S1}$ of the threshold lines $L_S$ (refer to FIG. 1) is selected, as the line indicating the threshold value of the coolant temperature Tw with respect to the target air temperature $T_{AO}$.

Then, in step 134, the coolant temperature Tw detected by the coolant-temperature sensor 92 is read. Then, in step 136, it is determined whether the coolant temperature Tw is equal to or below the first threshold value on the threshold line $L_{S1}$ with respect to the target air temperature $T_{AO}$.

When the coolant temperature Tw is equal to or below the first threshold value on the threshold line $L_{S1}$ with respect to the target air temperature $T_{AO}$ (i.e., an affirmative determination is made in step 136), the routine proceeds to step 138. In step 138, the flag F is set to 1 (F=1) to prohibit stopping of the engine 36.

When the coolant temperature Tw is above the first threshold value on the threshold line $L_{S1}$ with respect to the target air temperature $T_{AO}$ (i.e., a negative determination is made in step 136), the routine proceeds to step 140. In step 140, the flag F is reset (i.e., the flag F is set to 0; F=0) to permit stopping of the engine 36.

When the vehicle is moving (i.e., the speed v is above the set speed $v_0$), an affirmative determination is made in step 130, and the routine proceeds to step 142. In step 142, the threshold line $L_{S2}$ of the threshold lines $L_S$ (refer to FIG. 1) is selected, as the line showing the threshold value of the coolant temperature Tw with respect to the target air temperature $T_{AO}$. The second threshold value on the threshold line $L_{S2}$ is higher than the first threshold value on the standard threshold line $L_{S1}$.

Thus, when the vehicle is moving, the threshold value of the coolant temperature Tw is set to a higher value than when the vehicle is stopped. That is, when the vehicle is moving, the engine 36 is less likely to stop, and the coolant temperature Tw is maintained at a higher temperature than when the vehicle is stopped. When the vehicle stops, the threshold line $L_{S1}$ is selected again as the threshold line showing the threshold value of the coolant temperature Tw with respect to the target air temperature $T_{AO}$, instead of the threshold line $L_{S2}$, used when the vehicle is moving. The first threshold value on the threshold line $L_{S1}$ is lower than the second threshold value on the threshold line $L_{S2}$.

Thus, when the air conditioner 10 is heating the vehicle cabin, and the vehicle stops, and accordingly the engine stop condition is satisfied, it is possible to decrease the frequency with which the engine 36 is restarted due to a decrease in the coolant temperature.

Figure 6A:
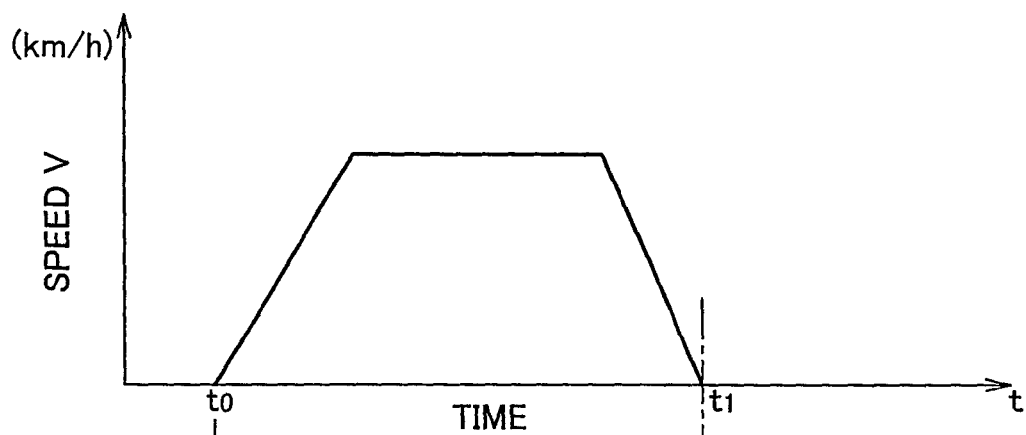
FIG. 6A is a diagram showing an example of the movement pattern of a vehicle.
Figure 6B:
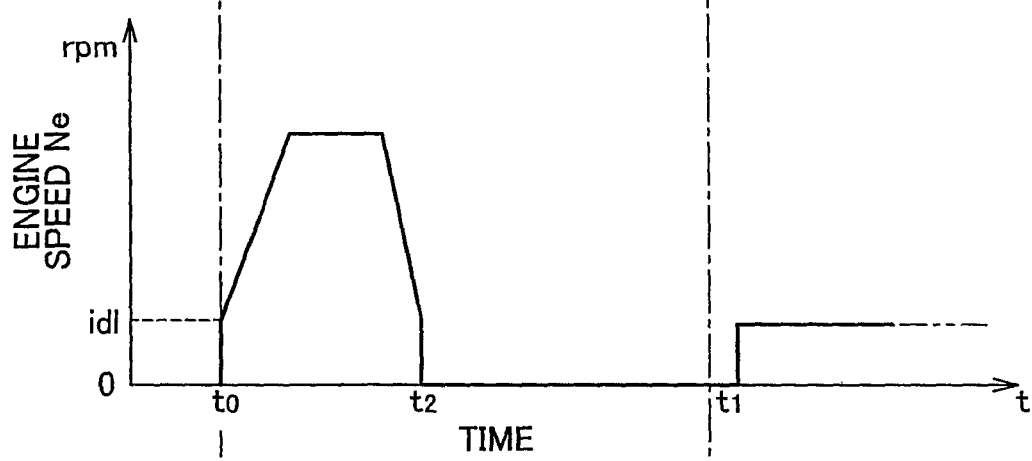
FIGS. 6B and 6C are diagrams showing examples of changes in an engine speed based on the movement pattern shown in FIG. 6A.

For example, if the vehicle is moving in the period between time $t_0$ time $t_1$ as shown in FIG. 6A, and stopping of the engine 36 is prohibited using the threshold line $L_{S1}$, the engine 36 stops (i.e., the engine speed Ne=0) at time point $t_2$ when the engine stop condition is satisfied and the coolant temperature Tw exceeds the first threshold value on the threshold line $L_{S1}$, as shown in FIG. 6B.

Figure 6C:
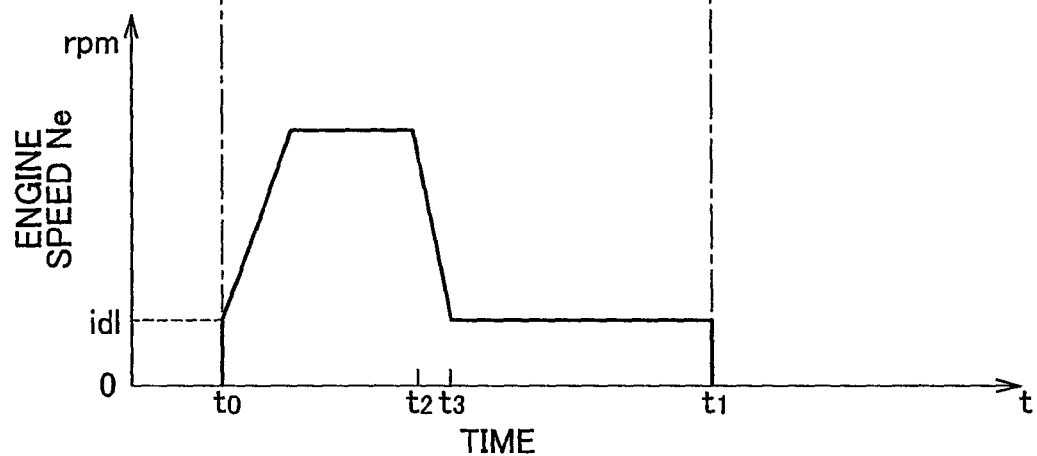

When the coolant temperature Tw is equal to or below the first threshold value on the threshold line $L_{S1}$, and the air conditioner 10 is on, the engine 36 restarts while the vehicle is stopped. In FIGS. 6B and 6C, the speed of the engine 36 when the engine 36 is idling (i.e., the minimum engine speed) is referred to as "idl".

In contrast, when the threshold line $L_{S2}$ is employed, the engine speed Ne decreases until time $t_3$ ($t_2 < t_3$), and the engine 36 is idling and does not stop, as shown in FIG. 6C. The second threshold value on the threshold line $L_{S2}$ is higher than the first threshold value on the threshold line $L_{S1}$. When the vehicle stops, the threshold line $L_{S1}$ is selected, and thus the engine 36 stops.

When the vehicle is stopped, the coolant temperature Tw is maintained at a value higher than the second threshold value on the threshold line $L_{S2}$. Therefore, immediately after the vehicle stops, it takes time until the coolant temperature Tw decreases to the first threshold value on the threshold line $L_{S1}$. Thus, immediately after the vehicle stops, the engine 36 is kept stopped.

This reduces the possibility that the fuel efficiency decreases due to starting of the engine 36 when the vehicle is stopped. This also reduces the possibility that the occupant in the vehicle feels vibration and engine sound caused by the starting of the engine 36 when the vehicle is stopped.

In the embodiment that has been described, it is determined whether the vehicle is moving based on the vehicle speed detected by the vehicle-speed sensor 88. However, the invention is not limited to this configuration. It may be determined whether there is a possibility that the vehicle will stop, based on the driver's operation in the vehicle and control performed in the vehicle. In this case, when it is determined that the vehicle is moving, the threshold line $L_{S2}$ is employed. When there is a possibility that the vehicle will stop, the threshold line $L_{S1}$ is employed.

Figure 7:
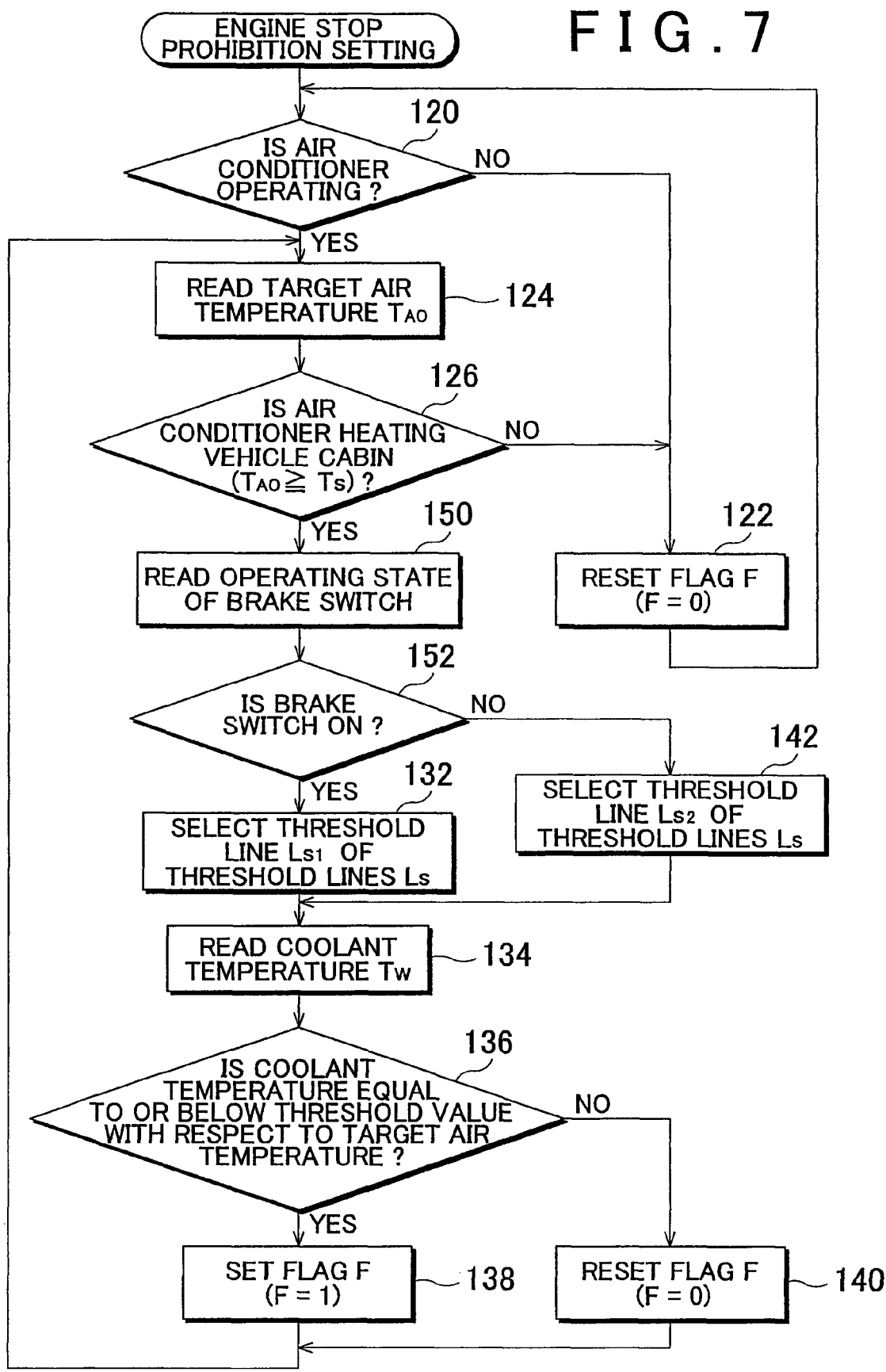
FIG. 7 is a flowchart schematically showing another example of the control that makes the settings to prohibit the stop of the engine when the air conditioner is heating the vehicle cabin.
Figure 8:
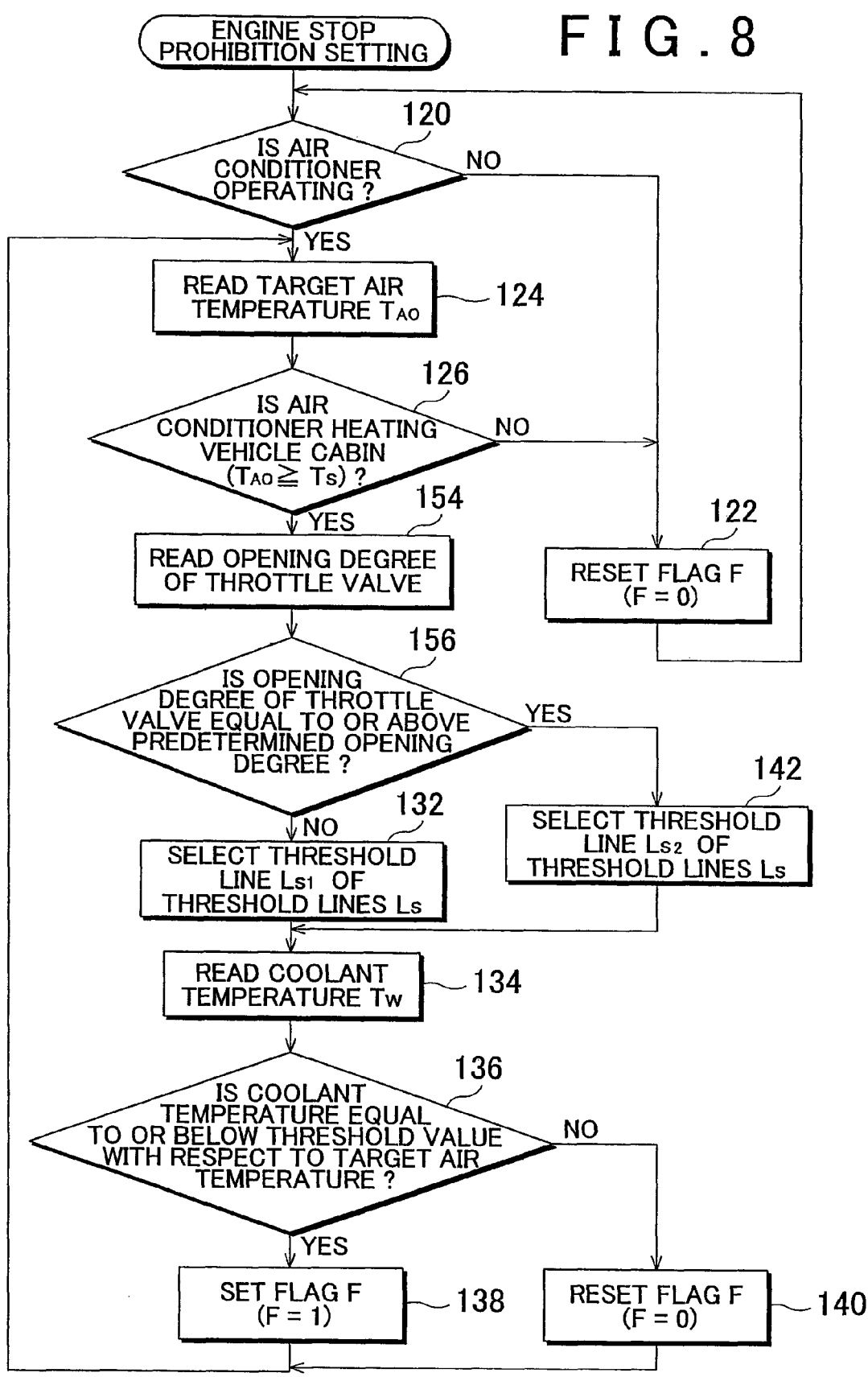
FIG. 8 is a flowchart schematically showing still another example of the control that makes the settings to prohibit the stop of the engine when the air conditioner is heating the vehicle cabin.

FIGS. 7 and 8 schematically show the routines in this case. In FIGS. 7 and 8, the same processes as those shown in FIG. 5 are denoted by the same step numbers, and the detailed description thereof will be omitted.

FIG. 7 schematically shows the routine in which the operation of the brake pedal and the operation of the parking brake are detected as the driver's operation in the vehicle. In this case, one brake switch 80 is used. The brake switch 80 includes a brake pedal switch and a parking brake switch that are connected in parallel to each other. The brake pedal switch is turned on when the brake pedal is operated. The parking brake switch is turned on when the parking brake is operated.

In this flowchart, when the target air temperature $T_{AO}$ is equal to or above the reference temperature Ts (i.e., an affirmative determination is made in step 126), the routine proceeds to step 150. In step 150, the operating state of the brake switch 80 is read. Then, it is determined whether the brake switch 80 is on in step 152.

When the brake pedal is operated to decelerate the vehicle, or the parking brake is operated to stop the vehicle, and accordingly the brake switch 80 is on, an affirmative determination is made in step 152, and the routine proceeds to step 132. In step 132, the threshold line $L_{S1}$ of the threshold lines $L_S$ is selected.

In contrast, when neither the brake pedal nor parking brake is operated, it is determined that the vehicle is moving, and a negative determination is made in step 152. Then, the routine proceeds to step 142. In step 142, the threshold line $L_{S2}$ of the threshold lines $L_S$ is selected to increase the coolant temperature Tw.

FIG. 8 schematically shows the routine in which the opening degree of the throttle valve detected by the throttle-valve opening degree sensor 78 is used as the value indicating the movement of the vehicle.

In this flowchart, when the target air temperature $T_{AO}$ is equal to or above the reference temperature Ts (i.e., an affirmative determination is made in step 126), the routine proceeds to step 154. In step 154, the opening degree of the throttle valve detected by the throttle-valve opening degree sensor 78 is read. Then, it is determined whether the opening degree of the throttle valve is equal to or above a predetermined opening degree in step 156. In other words, it is determined whether the opening degree of the throttle valve is below the predetermined opening degree. The predetermined opening degree may be set to a value at which the throttle valve is regarded as substantially fully closed (for example, the predetermined opening degree may be equivalent to approximately 1 to 2% of the opening degree when the throttle valve is fully open).

When the vehicle is decelerating or stopped, and accordingly the opening degree of the throttle valve is below the predetermined opening degree, a negative determination is made in step 156, and the routine proceeds to step 132. In step 132, the threshold line $L_{S1}$ of the threshold lines $L_S$ is selected.

In contrast, when the vehicle is moving, and the opening degree of the throttle valve is equal to or above the predetermined opening degree, it is determined that the vehicle is moving, and an affirmative determination is made in step 156. Then, the routine proceeds to step 142. In step 142, the threshold line $L_{S2}$ of the threshold lines $L_S$ is selected so that the coolant temperature Tw is maintained at a value higher than the first threshold value on the threshold line $L_{S1}$.

Thus, when the vehicle is moving, the threshold value of the coolant temperature Tw, at which stopping of the engine 36 is permitted, is increased to increase the heat capacity of the coolant. When the vehicle stops, the threshold value of the coolant temperature Tw, at which stopping of the engine 36 is permitted, is decreased to decrease the frequency of restarting the engine 36. Because a large amount of heat has been stored in the engine coolant, a decrease in the heating capacity of the air conditioner 10 is suppressed when the vehicle stops.

It may be determined whether the vehicle is moving in a manner other than the above-described manners. For example, the values that indicate the driver's operation in the vehicle, and the movement of the vehicle (control for driving the vehicle), such as the accelerator-pedal operation amount detected by the accelerator-pedal position sensor 84, may be detected using sensors, and the detected values may be used to determine whether the vehicle is moving.

The invention is not limited to the above-described embodiments. For example, although the engine ECU 60, which controls the engine 36, determines the operating state of the air conditioner 10, the invention is not limited to this configuration. For example, the air conditioner ECU 42, which controls the air conditioner 10, may determine the operating state of the engine 36, and may permit stopping of the engine 36 or request the engine ECU 60 to prohibit stopping of the engine 36. In this case, the engine ECU 60 stops the engine 36 or prohibits stopping of the engine 36 based on the request from the air conditioner ECU 42.

In this case, for example, when the flag F is set to 1 in the flowchart in FIG. 5, a request is made to prohibit stopping of the engine 36. When the flag F is reset, stopping of the engine 36 is permitted.

In each of the above-described embodiments, it is determined whether the air conditioner 10 is heating the vehicle cabin based on the target air temperature $T_{AO}$. However, because the target air temperature $T_{AO}$ is calculated based on the preset temperature $T_{SET}$, vehicle-cabin temperature Tr, outside-air temperature To, and solar radiation amount ST, it may be determined whether the air conditioner 10 is heating the vehicle cabin, based on the relation between the preset temperature $T_{SET}$, and the vehicle-cabin temperature Tr and outside-air temperature To.

In each of the above-described embodiments, the air conditioner ECU 42 controls the air conditioner 10, and the engine ECU 60 controls the engine 36. However, the invention may be applied to any vehicle provided with a vehicular air conditioning device with any configuration, as long as the vehicular air conditioning device heats the air using the heater core 32 where the engine coolant circulates.

As described above, in each of the above-described embodiments of the invention, when the vehicular air conditioning device is heating the vehicle cabin, and the vehicle is moving, the second threshold value is selected. The second threshold value is higher than the first threshold value, which is selected when the vehicle is stopped. Thus, when the vehicle is moving, the internal combustion engine is more likely to be driven, and the amount of heat stored in the coolant is greater than when the vehicle is stopped. This suppresses the decrease in the heating capacity of the vehicular air conditioning device, and the frequency of starting the internal combustion engine when the vehicle is stopped.

The invention claimed is:

1. A control apparatus for an internal combustion engine, which stops the internal combustion engine when a stop condition is satisfied, starts the internal combustion engine when a start condition is satisfied, and is provided with a vehicular air conditioning device that heats a vehicle cabin using a coolant for the internal combustion engine, the control apparatus comprising:
    a coolant-temperature detection device that detects a temperature of the coolant for the internal combustion engine;
    a stop prohibition device that prohibits stopping of the internal combustion engine when the vehicular air conditioning device is heating the vehicle cabin and the temperature of the coolant detected by the coolant-temperature detection device is equal to or below a threshold value;
    a movement determination device that determines whether the vehicle is moving; and
    a selection device that selects the threshold value, wherein the selection device selects a first value as the threshold value when the movement determination device determines that the vehicle is not moving, and selects a second threshold value, which is higher than the first threshold value, as the threshold value when the movement determination device determines that the vehicle is moving.

2. The control apparatus according to claim 1, wherein:
    the movement determination device comprises at least one of a vehicle-speed detection device that detects a vehicle speed, a braking determination device that determines whether a brake is applied to the vehicle by performing a braking operation, and an accelerator-pedal operation detection device that detects an operation of an accelerator pedal of the vehicle;
    the movement determination device determining whether the vehicle is moving, using at least one of the vehicle-speed detection devices, the braking determination device, and the accelerator-pedal operation detection device.

3. The control apparatus according to claim 1, wherein it is determined whether the vehicular air conditioning device is heating the vehicle cabin, based on at least one of a target temperature of air supplied into the vehicle cabin by the vehicular air conditioning device, and a heating load with respect to a target temperature of the vehicle cabin preset in the vehicular air conditioning device.

4. The control apparatus according to claim 1, wherein at least one of the first threshold value and the second threshold value includes a value at which stopping of the internal combustion engine is permitted, and another value at which stopping of the internal combustion engine is prohibited, and there is a predetermined difference between the value and the other value.

5. A method of controlling an internal combustion engine, which stops the internal combustion engine when a stop condition is satisfied, starts the internal combustion engine when a start condition is satisfied, and is provided with a vehicular air conditioning device that heats a vehicle cabin using a coolant for the internal combustion engine, the method comprising:

detecting a temperature of the coolant for the internal combustion engine;

prohibiting stopping of the internal combustion engine when the vehicular air conditioning device is heating the vehicle cabin and the detected temperature of the coolant is equal to or below a threshold value;

determining whether the vehicle is moving; and selecting a first threshold value as the threshold value when it is determined that the vehicle is not moving, and selecting a second threshold value, which is higher than the first threshold value, as the threshold value when it is determined that the vehicle is moving.

6. The method of controlling the internal combustion engine according to claim 5, wherein it is determined whether the vehicle is moving based on at least one of a vehicle speed, a braking operation, and an operation of an accelerator pedal.

7. The method of controlling the internal combustion engine according to claim 5, wherein it is determined whether the vehicular air conditioning device is heating the vehicle cabin, based on at least one of a target temperature of air supplied into the vehicle cabin by the vehicular air conditioning device, and a heating load with respect to a target temperature of the vehicle cabin preset in the vehicular air conditioning device.

8. The method of controlling the internal combustion engine according to claim 5, wherein at least one of the first threshold value and the second threshold value includes a value at which stopping of the internal combustion engine is permitted, and another value at which stopping of the internal combustion engine is prohibited, and there is a predetermined difference between the value and the other value.

* * * * *